(12) United States Patent
Eronen

(10) Patent No.: US 7,945,112 B2
(45) Date of Patent: May 17, 2011

(54) METHOD FOR DISPLAYING DIGITAL GREY SCALE IMAGES AT DESIRED TONAL VALUE ON A SCREEN OF A DISPLAY DEVICE AND A DISPLAY DEVICE

(75) Inventor: Esa Eronen, Kaarina (FI)

(73) Assignee: PaloDEx Group Oy (FI)

( * ) Notice: Subject to any disclaimer, the term of this patent is extended or adjusted under 35 U.S.C. 154(b) by 1034 days.

(21) Appl. No.: 10/575,821

(22) PCT Filed: Oct. 13, 2004

(86) PCT No.: PCT/FI2004/050148
§ 371 (c)(1),
(2), (4) Date: Feb. 6, 2007

(87) PCT Pub. No.: WO2005/038712
PCT Pub. Date: Apr. 28, 2005

(65) Prior Publication Data
US 2007/0274587 A1    Nov. 29, 2007

(30) Foreign Application Priority Data
Oct. 15, 2003   (FI) ..................... 20035184

(51) Int. Cl.
*G06K 9/40* (2006.01)
(52) U.S. Cl. ....... 382/274; 382/260; 382/275; 358/3.26; 358/3.27
(58) Field of Classification Search .................. 382/260, 382/274, 275; 358/3.26, 3.27, 463
See application file for complete search history.

(56) References Cited

U.S. PATENT DOCUMENTS

| | | | | |
|---|---|---|---|---|
| 5,291,889 A | * | 3/1994 | Kenet et al. | 600/425 |
| 5,751,829 A | * | 5/1998 | Ringland et al. | 382/100 |
| 6,057,931 A | * | 5/2000 | McConnell et al. | 358/1.9 |
| 6,122,391 A | * | 9/2000 | Ringland et al. | 382/100 |
| 6,215,900 B1 | | 4/2001 | Schwenker et al. | |
| 6,275,718 B1 | * | 8/2001 | Lempert | 600/407 |
| 6,704,467 B2 | * | 3/2004 | Uchida | 382/311 |
| 6,937,249 B2 | * | 8/2005 | Herbert et al. | 345/581 |
| 6,999,213 B2 | * | 2/2006 | Kinumura et al. | 358/521 |
| 7,027,054 B1 | * | 4/2006 | Cheiky et al. | 345/473 |
| 7,260,249 B2 | * | 8/2007 | Smith | 382/128 |
| 2003/0053668 A1 | | 3/2003 | Ditt et al. | |

FOREIGN PATENT DOCUMENTS
EP    1 004 984    5/2000

* cited by examiner

*Primary Examiner* — Yosef Kassa
(74) *Attorney, Agent, or Firm* — Andrus, Sceales, Starke & Sawall, LLP

(57) ABSTRACT

The invention relates to a method for displaying digital grey scale images at a desired tonal value on the screen of a display device. In the method, the operator pre-selects (300) manually, for example on the basis of an image visible on a display screen, a (mean) grey scale level of his/her desire, the values consistent therewith being stored (302) in a memory associated with a display device. When the operator picks up (304) a new image for examination, the memory is accessed to retrieve (306) therefrom the information regarding a target grey scale level and relevant to the present operator, said information being used for automatically calculating an individual transformation function relevant to the present new image and the image is automatically adjusted to an operator-specific target grey scale level (310).

5 Claims, 3 Drawing Sheets

METHOD FOR DISPLAYING DIGITAL GREY SCALE IMAGES AT DESIRED TONAL VALUE ON A SCREEN OF A DISPLAY DEVICE AND A DISPLAY DEVICE

CROSS REFERENCE TO RELATED APPLICATION

The present application is the U.S. national stage application of International Application PCT/FI2004/050148, filed Oct. 13, 2004, which international application was published on Apr. 28, 2005 as International Publication WO 2005/038712. The International Application claims priority of Finnish Patent Application 20035184, filed Oct. 15, 2003.

BACKGROUND OF THE INVENTION

The present invention relates to a method for displaying digital grey scale images at a desired tonal value on the screen of a display device. The invention relates also to a display device for implementing the method.

The invention has been conceived particularly for application in relation to medical digital grey scale images, such as e.g. X-ray images, but it is conceivable for other applications as well.

At present, in the process of examining medical digital grey scale images, the shape of a graph relevant to grey scale transformation is adjusted manually for each individual image.

SUMMARY OF THE INVENTION

Accordingly, it is an object of the present invention to provide a method and a display device, whereby images examined by an operator can be adjusted automatically to a tonal value desired by the operator. In order to achieve this objective, a method of the invention is characterized in that, in the method, the operator pre-selects manually, for example on the basis of an image visible on a display screen, a grey scale level of his/her desire, the values consistent therewith being stored in a memory associated with a display device, whereby, when the operator picks up a new image for examination, the memory is accessed to retrieve therefrom the information regarding a target grey scale level and relevant to the present operator, said information being used for automatically calculating an individual transformation function relevant to the present new image and the image is automatically adjusted to the operator-specific target grey scale level. A display device of the invention is in turn characterized in that the device comprises means for manually adjusting the grey scale level of an image to a target grey scale level desired by the operator, memory means for storing therein values relevant to the operator-specific target grey scale level, and computing means for calculating operator-specifically an individual image-specific transformation function for each new image to be examined. The computing means comprise e.g. a microprocessor.

The brightness and contrast of an image are usually controlled manually by separately adjusting brightness and contrast controls, which is time consuming.

Thus, it is a further object of the invention to also provide a method, whereby the brightness and contrast of an image can be controlled in a manner simpler than at present.

In order to achieve this objective, a method according to one preferred further development of the invention is characterized in that, in the method, the brightness of an image adjusts automatically as a result of such a control of contrast that each value of contrast control results in such a selection of the brightness value that as little as possible of the image area is visible in black or white while as much as possible is visible in various tones of grey.

BRIEF DESCRIPTION OF THE DRAWINGS

The invention will now be described in more detail with reference to the accompanying drawings, in which.

DETAILED DESCRIPTION OF THE INVENTION

Figure 1:
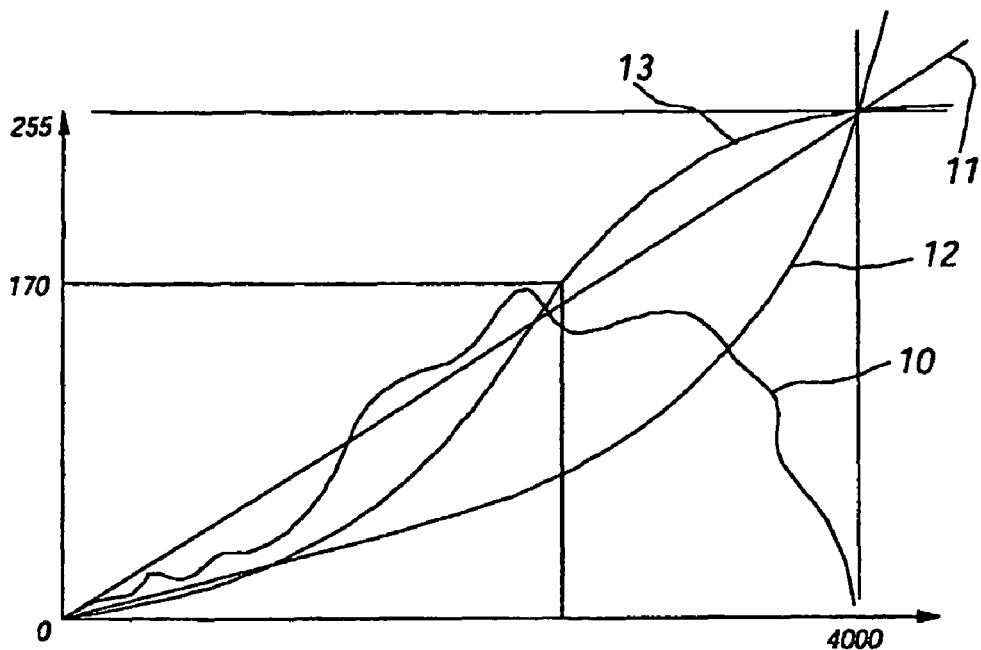
FIG. 1 shows diagrammatically a few currently employed image histogram transformation functions.
Figure 2:
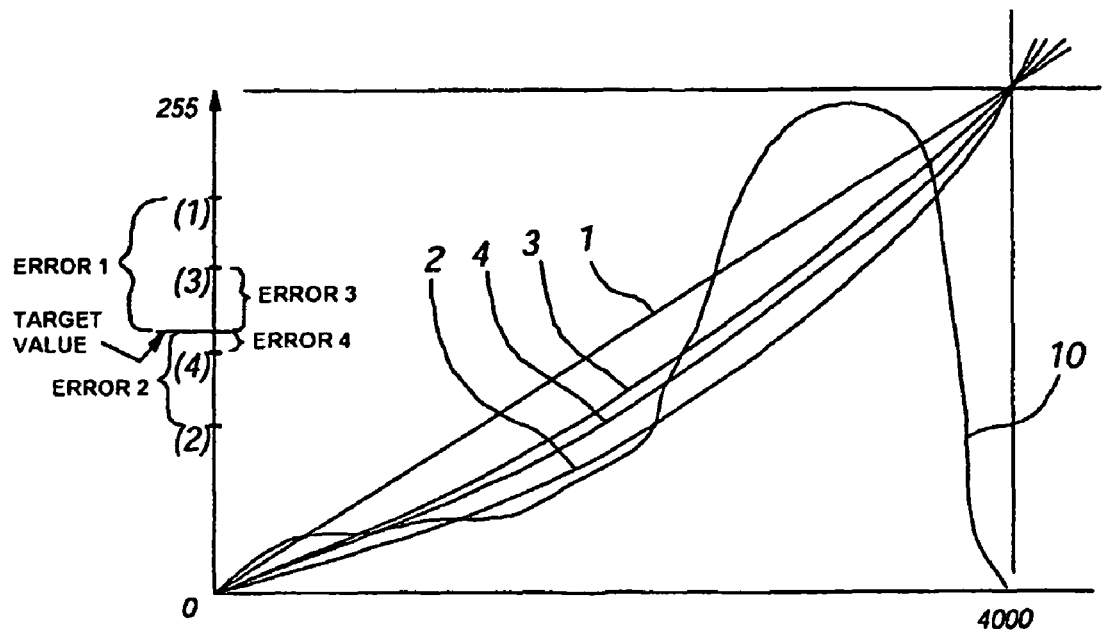
FIG. 2 shows diagrammatically one optimal image histogram transformation function calculable according to the invention.

In FIGS. 1 and 2, the vertical axis represents the grey scale of a display screen and the horizontal axis represents the grey scale of measured data.

In FIG. 1, a graph 10 represents a histogram for an image to be examined, containing a number of grey tones which is multiple with respect to what can be shown on the screen of an ordinary display device (typically a screen is only able to display 256 grey tones while an image histogram may contain thousands of grey tones). In addition, the tonal distribution of an original image can be such that the image is excessively light or dark for the regions of interest to be clearly visible on the display screen.

The image histogram (graph 10) can be subjected to a grey scale/histogram transformation to make the image visually more toned on a display device. One frequently used histogram transformation function comprises an exponential function, having its shape manually adjustable by means of controls. In FIG. 1, reference numeral 11 depicts a linear transformation, which does not change the tonal distribution but enables the original image to be shown on a display screen. A graph 12 represents a commonly employed exponential function with fixed parameter values. A graph 13 represents an S-graph with fixed parameter values. Other possible functions include e.g. a logarithmic function, a power-law function, and a square-law function.

In FIG. 2, a graph 10 represents a histogram for an image to be examined. The example of FIG. 2 is based on a linear transformation indicated by reference numeral 1. From the graph is calculated a mean grey scale level, and then, for example by using a method of least square, it is compared with an operator-specific target level. On the basis of the comparison, an error 1 is obtained between the graph 1 and the operator-specific target level. This is followed by selecting a desired optimization algorithm, which is used for correcting parametric values of the graph 1, resulting in a graph 2 from which is again calculated a mean grey scale level and an error 2. This goes on for calculating graphs 3 and 4 and further until the error is minimized and is e.g. less than 0.1.

Instead of the mean grey scale level, the comparison can also be done by using other statistical quantities, such as e.g. standard deviation and median, or other functions representing the shape of a histogram.

Figure 3:
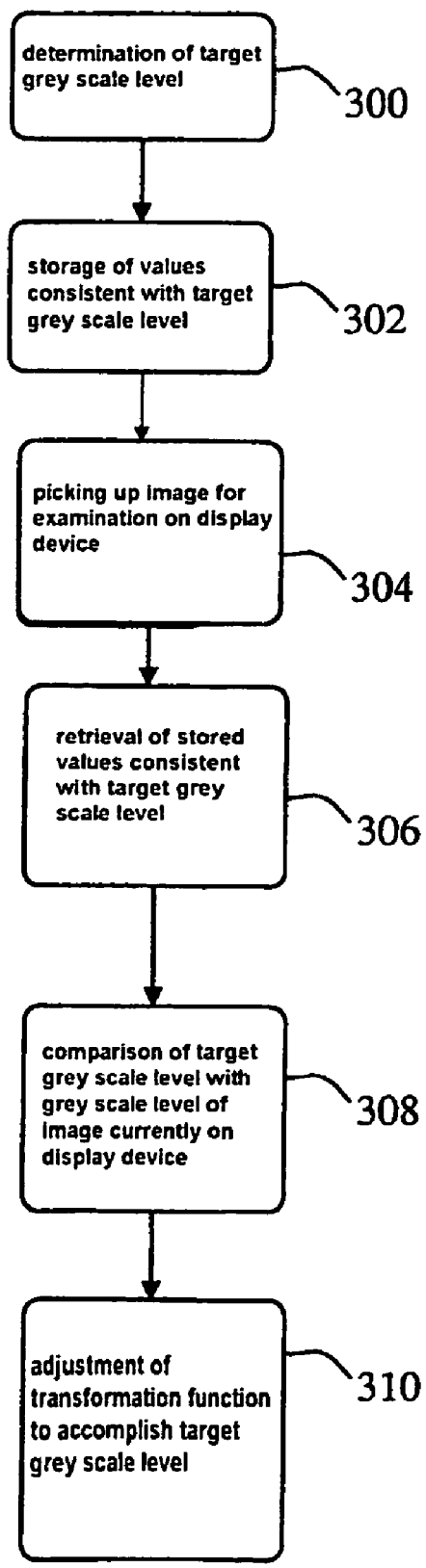
FIG. 3 shows a flowchart for procedures in a method according to a first aspect of the invention.

FIG. 3 is a flowchart depicting the procedures for adjusting images examined by an operator automatically to a tonal value desired by the operator. In a procedure 300, the operator determines a tonal value of his/her desire. A procedure 302 comprises storing values consistent with the target grey scale in a memory associated with a display device. In a procedure 304, the operator picks up a new image for examination on a display device. In a procedure 306, the memory is accessed to retrieve therefrom the information regarding a target grey scale and relevant to the present operator. A procedure 308 comprises a comparison between the target grey scale level and the grey scale level of an image presently on the display device, and a procedure 310 comprises calculating an individual transformation function relevant to the new image and adjusting the image automatically to the target grey scale level.

Figure 4:
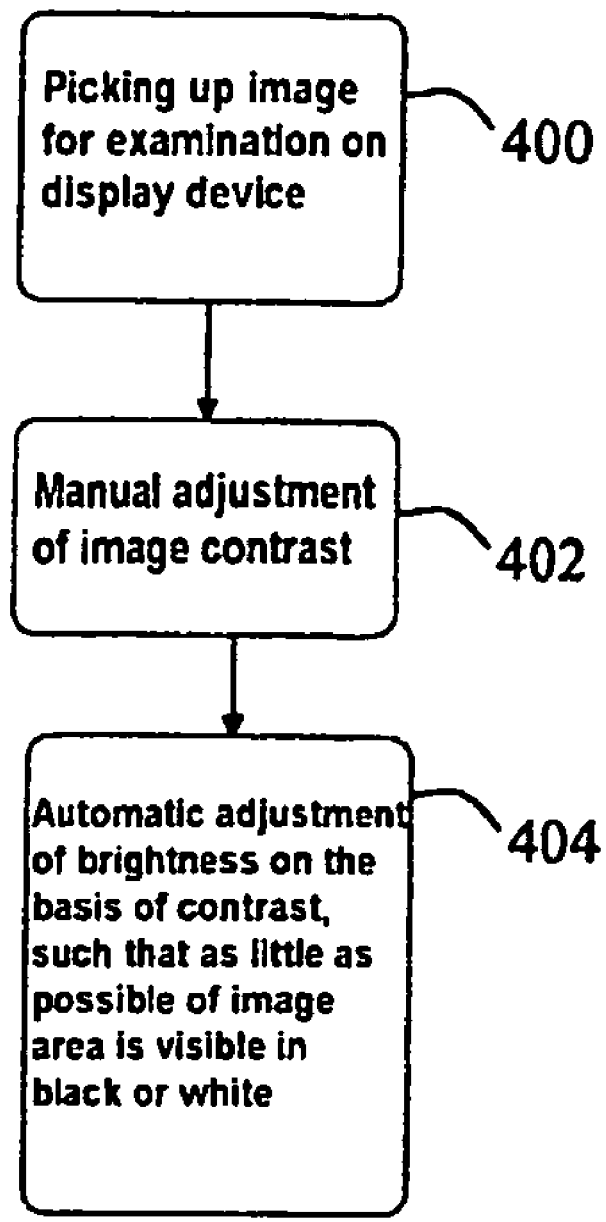
FIG. 4 shows a flowchart for procedures in a method according to a second aspect of the invention.

FIG. 4 is a flowchart depicting the procedures for adjusting an image brightness automatically along with contrast control. A procedure 400 comprises picking up an image for examination on a display device. In a procedure 402, the image contrast is adjusted manually. A procedure 404 comprises adjusting the image brightness automatically on the basis of contrast, such that as little as possible of the image area is visible in black or white.

The invention claimed is:

1. A method for displaying digital grey scale images at a desired tonal value on a display screen of a display device, the method comprising:
- pre-selecting based on an image visible on a display screen of a display device, a grey scale level of desire of an operator;
- storing values consistent with the grey scale level of desire in a memory associated with the display device to form an operator-specific target grey scale level;
- accessing the memory to retrieve therefrom information regarding the operator-specific target grey scale level when the operator picks up a new image for examination;
- automatically calculating an individual transformation function relevant to the new image based on the information; and
- automatically adjusting the new image to the operator-specific target grey scale level based on the individual transformation function.

2. A method as set forth in claim 1, wherein the individual transformation function is calculated by first selecting a desired initial function to be parameterized, the parameters of which are then optimized by an appropriate optimization algorithm for reaching the operator-specific target grey scale level.

3. A method as set forth in claim 2, wherein the transformation function comprises an exponential function.

4. A method as set forth in claim 2, wherein the transformation function produces an S-graph.

5. A method as set forth in claim 2, wherein the transformation function produces a multi-segment graph.

* * * * *